US012782548B2

(12) United States Patent
Hou

(10) Patent No.: US 12,782,548 B2
(45) Date of Patent: Nov. 3, 2026

(54) HEIGHT INFORMATION RECONSTRUCTION SYSTEM AND HEIGHT INFORMATION RECONSTRUCTION METHOD

(71) Applicant: Industrial Technology Research Institute, Hsinchu (TW)

(72) Inventor: Chun-Yu Hou, Taipei City (TW)

(73) Assignee: Industrial Technology Research Institute, Hsinchu (TW)

( * ) Notice: Subject to any disclaimer, the term of this patent is extended or adjusted under 35 U.S.C. 154(b) by 180 days.

(21) Appl. No.: 18/970,936

(22) Filed: Dec. 6, 2024

(65) Prior Publication Data

US 2026/0160883 A1 Jun. 11, 2026

(51) Int. Cl.
*G01S 13/89* (2006.01)
*G01C 21/16* (2006.01)
*G01S 13/58* (2006.01)

(52) U.S. Cl.
CPC .......... *G01S 13/89* (2013.01); *G01C 21/1652* (2020.08); *G01S 13/58* (2013.01)

(58) Field of Classification Search
CPC combination set(s) only.
See application file for complete search history.

(56) References Cited

U.S. PATENT DOCUMENTS

2021/0141092 A1* 5/2021 Chen ..................... G01S 13/862
2023/0314588 A1 10/2023 Hoffmann et al.

FOREIGN PATENT DOCUMENTS

CN 102248947 11/2011
CN 109249929 1/2019
CN 116929363 10/2023

(Continued)

OTHER PUBLICATIONS

Hou et al., Automotive Radar Missing Dimension Reconstruction from Motion, Oct. 2023, 2023 IEEE/RSJ International Conference on Intelligent Robots and Systems (IROS), pp. 11226-11232 (Year: 2023).*

(Continued)

*Primary Examiner* — Olumide Ajibade Akonai
*Assistant Examiner* — Eric K Hodac
(74) *Attorney, Agent, or Firm* — JCIPRNET

(57) ABSTRACT

A height information reconstruction method suitable for a vehicle, includes: sensing multiple entities through a three-dimensional radar to generate a three-dimensional radar point cloud corresponding to the vehicle; sensing entities through an inertial measurement unit to generate inertial measurement data corresponding to the vehicle data; and executing through the processor: receiving the three-dimensional radar point cloud and the inertial measurement data, and calculating the radar displacement and radar velocity of the three-dimensional radar; calculating the radial velocity of each entity based on the radar speed; performing dynamic segmentation to extract a static entity in the entities based on the radar velocity and radial velocity; calculating the elevation angle of the static entity; performing temporal filtering to calculate the height value of the static entity based on the elevation angle and the radar displacement; and generating a height reconstruction radar point cloud based on the height value of the static entity.

10 Claims, 6 Drawing Sheets

(56) References Cited

FOREIGN PATENT DOCUMENTS

| | | |
|---|---|---|
| CN | 118131230 | 6/2024 |
| TW | I843116 | 5/2024 |

OTHER PUBLICATIONS

"Office Action of Taiwan Counterpart Application", issued on Dec. 24, 2025, p. 1-p. 6.

Pou-Chun Kung et al., "Radar Occupancy Prediction With Lidar Supervision While Preserving Long-Range Sensing and Penetrating Capabilities", IEEE Robotics and Automation Letters, vol. 7, No. 2, Apr. 2022, pp. 2637-2643.

Aaron Kingery et al., "Improving Ego-Velocity Estimation of Low-Cost Doppler Radars for Vehicles", IEEE Robotics and Automation Letters, vol. 7, No. 4, Oct. 2022, pp. 9445-9452.

Xu Dong et al., "Probabilistic Oriented Object Detection in Automotive Radar", 2020 IEEE/CVF Conference on Computer Vision and Pattern Recognition Workshops (CVPRW), Jun. 14-19, 2020, pp. 1-10.

Pengen Gao et al., "DC-Loc: Accurate Automotive Radar Based Metric Localization with Explicit Doppler Compensation", 2022 IEEE International Conference on Robotics and Automation (ICRA), May 23-27, 2022, pp. 4128-4134.

Dominik Kellner et al., "Instantaneous Ego-Motion Estimation using Doppler Radar", Proceedings of the 16th International IEEE Annual Conference on Intelligent Transportation Systems (ITSC 2013), Oct. 6-9, 2013, pp. 869-874.

Sen Yuan et al., "3-D Ego-Motion Estimation Using Multi-Channel FMCW Radar", IEEE Transactions on Radar Systems, Jul. 26, 2023, pp. 368-381.

* cited by examiner

HEIGHT INFORMATION RECONSTRUCTION SYSTEM AND HEIGHT INFORMATION RECONSTRUCTION METHOD

TECHNICAL FIELD

The present disclosure relates to a reconstruction technology, and particularly relates to a height information reconstruction system and a height information reconstruction method.

BACKGROUND

The application of radar sensors has become widespread, and in recent years, the application of high-performance radar has also made significant progress. More and more autonomous driving tasks may be solved through radar sensors.

In the known technology, powerful algorithms exist that may use a single Doppler radar to estimate the velocity and yaw rate of an autonomous vehicle in real-time. However, the height of static entities is not considered. The radial velocity measurements of static entities with non-zero height are smaller than those of static entities with zero height, but the algorithm treats this height-induced difference as sensor uncertainty.

There are also known technologies that obtain more accurate position estimates through Doppler distortion, but still lack three-dimensional data. The main reason is that current automotive 3D radar does not include elevation angle data for static entities, and cannot distinguish between static entities at different heights, such as bridges.

Moreover, due to the arrangement of the antenna array, there is no height measurement, and only planar positioning can be performed, making it impossible to achieve six-degree-of-freedom positioning. Entity tracking further requires ignoring static entities to avoid erroneous braking under elevated bridge structures. Although new four-dimensional automotive radar can theoretically handle the aforementioned problems, its cost is 2 to 3 times that of 3D automotive radar, and it has not yet been widely installed in products.

Therefore, estimating the elevation angle of static entities based on the relative velocity and radial velocity measurements from the vehicle's radar, and reconstructing the elevation angle on 3D automotive radar, may solve the problem of missing altitude information in 3D automotive radar. This may achieve six-degree-of-freedom positioning and obstacle avoidance effects, and may even be widely applied to existing vehicle models with autonomous and assisted driving capabilities.

SUMMARY

The present disclosure provides a height information reconstruction system, applicable to a vehicle, including: a 3D radar, an inertial measurement unit, and a processor set up on the vehicle. The 3D radar is used to sense multiple entities to generate a 3D radar point cloud corresponding to the vehicle. The inertial measurement unit is used to sense entities to generate inertial measurement data corresponding to the vehicle. The processor is coupled to the 3D radar and the inertial measurement unit, and is used to execute: receiving the 3D radar point cloud and inertial measurement data, and calculating the radar displacement and radar velocity of the 3D radar accordingly; calculating the radial velocity of each entity according to the radar velocity; executing dynamic segmentation based on the radar velocity and radial velocity to extract static entities from the entities; calculating the elevation angle of the static entities; executing temporal filtering based on the elevation angle and radar displacement to calculate the height value of the static entities; and generating an altitude information reconstructed radar point cloud according to the height value of the static entities.

The present disclosure also provides a height information reconstruction method, applicable to a vehicle, including: sensing multiple entities through a 3D radar to generate a 3D radar point cloud corresponding to the vehicle; sensing these entities through an inertial measurement unit to generate inertial measurement data corresponding to the vehicle; and executing through a processor: receiving the 3D radar point cloud and the inertial measurement data, and calculating the radar displacement and radar velocity of the 3D radar accordingly; calculating the radial velocity of each of these entities according to the radar velocity; executing dynamic segmentation based on the radar velocity and the radial velocity to extract static entities from these entities; calculating the elevation angle of the static entities; executing temporal filtering based on the elevation angle and the radar displacement to calculate the height value of the static entities; and generating an altitude information reconstructed radar point cloud according to the height value of the static entities.

Based on the above, the height information reconstruction system and height information reconstruction method provided by the present disclosure may estimate the elevation angle of static entities according to the relative velocity and radial velocity measurements from the vehicle's radar, and reconstruct the elevation angle on 3D automotive radar, which may solve the problem of missing altitude information in 3D automotive radar. This may achieve six-degree-of-freedom positioning and obstacle avoidance effects, and may even be widely applied to existing vehicle models with autonomous and assisted driving capabilities.

DESCRIPTION OF THE EMBODIMENTS

Some exemplary embodiments of the present disclosure will now be described in detail with reference to the accompanying drawings. In the following description, when the same element symbols appear in different drawings, they will be considered as the same or similar elements. These exemplary embodiments are only a part of the disclosure and do not disclose all possible implementations of this disclosure. More precisely, these exemplary embodiments are merely examples of the methods, devices, and systems within the scope of patent claims of the present disclosure.

Figure 1:
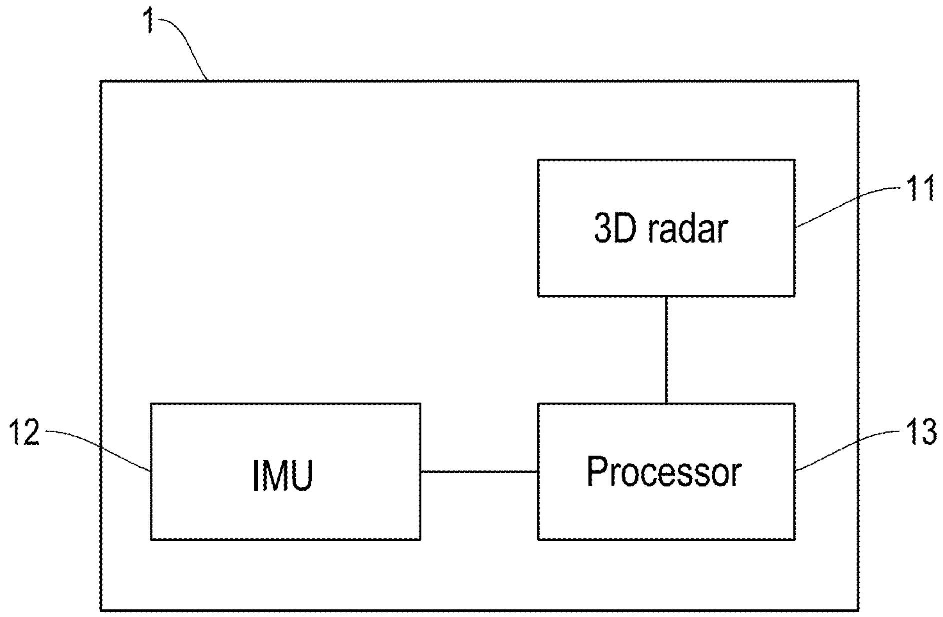
FIG. 1 is a block diagram illustrating a height information reconstruction system according to an embodiment of the present disclosure.

FIG. 1 is a block diagram illustrating a height information reconstruction system 1 according to an embodiment of the present disclosure. The height information reconstruction system 1 includes a 3D radar 11 installed on a vehicle, an inertial measurement unit (IMU) 12, and a processor 13, wherein the processor 13 is coupled to the 3D radar 11 and the inertial measurement unit 12.

The multiple 3D radars 11 may be installed on the vehicle, for example, placing the 3D radars 11 at the four corners and the front center position of the vehicle, to sense multiple entities detectable at the four corners and the front of the vehicle, in order to generate 3D radar point cloud corresponding to the vehicle.

The inertial measurement unit 12 is used to sense entities to generate inertial measurement data corresponding to the vehicle. The inertial measurement unit 12 may be, for example, a gyroscope, an accelerometer, and so on. Generally, the inertial measurement unit 12 is installed at the center of gravity of the vehicle.

The processor 13 is used to execute the height information reconstruction method according to the 3D radar point cloud and the inertial measurement data. The processor 13 may be a central processing unit (CPU), a micro-processor, or an embedded controller, which is not limited by this disclosure.

Figure 2:
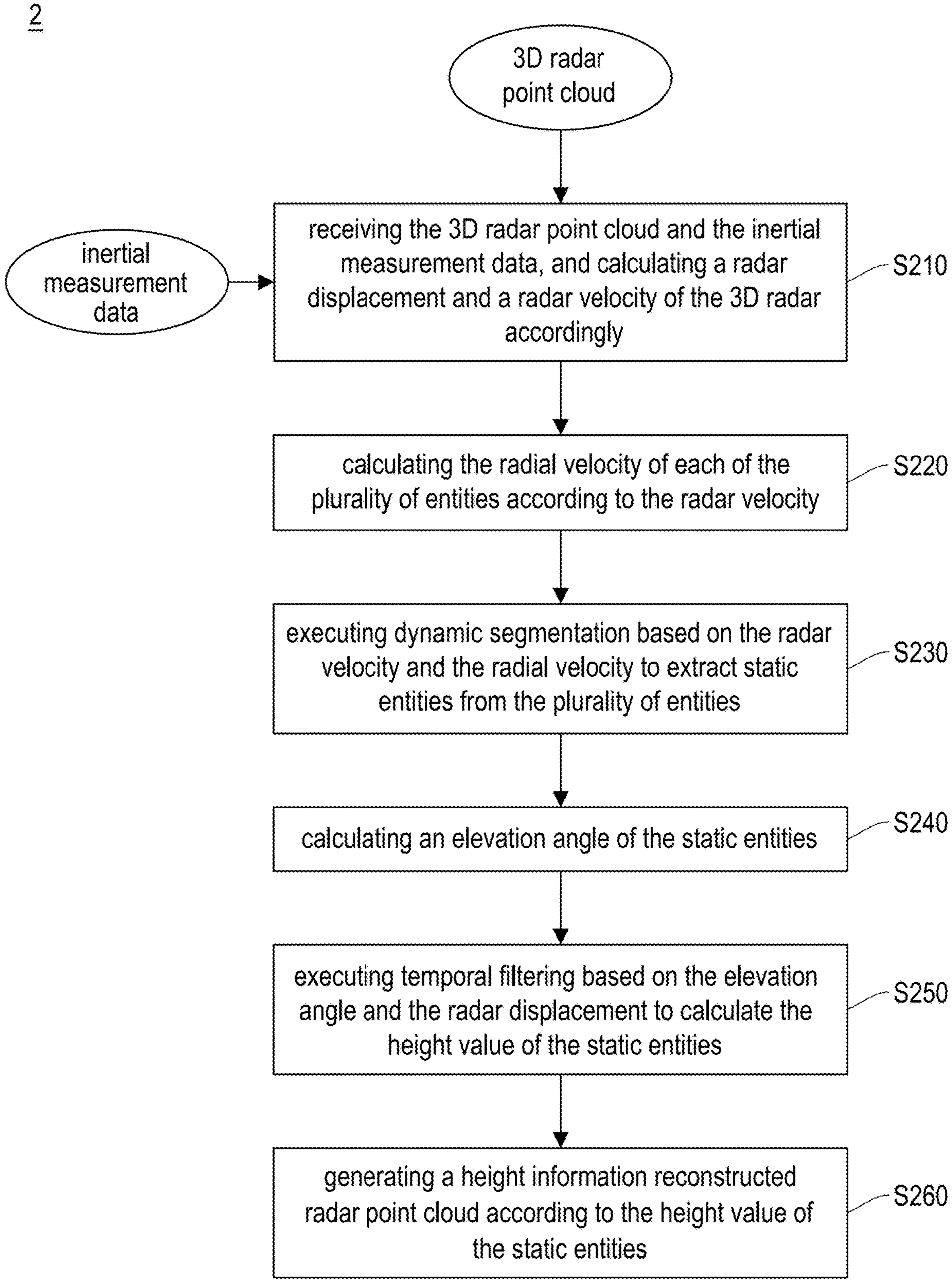
FIG. 2 is a flowchart illustrating a height information reconstruction method according to an embodiment of the present disclosure.

FIG. 2 is a flowchart illustrating a height information reconstruction method 2 according to an embodiment of the present disclosure. The height information reconstruction method 2 of FIG. 2 may be executed by the processor 13 of the height information reconstruction system 1 of FIG. 1. Please refer to both FIG. 1 and FIG. 2 for the following explanation of the height information reconstruction system 1 and the height information reconstruction method 2.

First, at step S210, the processor 13 receives 3D radar point cloud and inertial measurement data, and calculates the radar displacement and radar velocity accordingly. Estimating the radar velocity $\vec{v}_S$ and executing static entity detection is crucial for reconstructing the elevation angle of static entities. The technology of this disclosure estimates the component velocity $v_{S,x}$ of the radar velocity $\vec{v}_S$ separately on the x-axis, the component velocity $v_{S,y}$ of the radar velocity $\vec{v}_S$ separately on the y-axis, and the component velocity $v_{S,z}$ of the radar velocity $\vec{v}_S$ separately on the z-axis, and then performs static entity detection based on the estimated radar velocity $\vec{v}_S$.

First, to estimate the two-dimensional velocity $[v_{S,x}, v_{S,y}]$ of the 3D radar, this disclosure utilizes normal distribution transform-based radar odometry and an extended Kalman Filter (EKF) combined with the inertial measurement unit 12.

Figure 3:
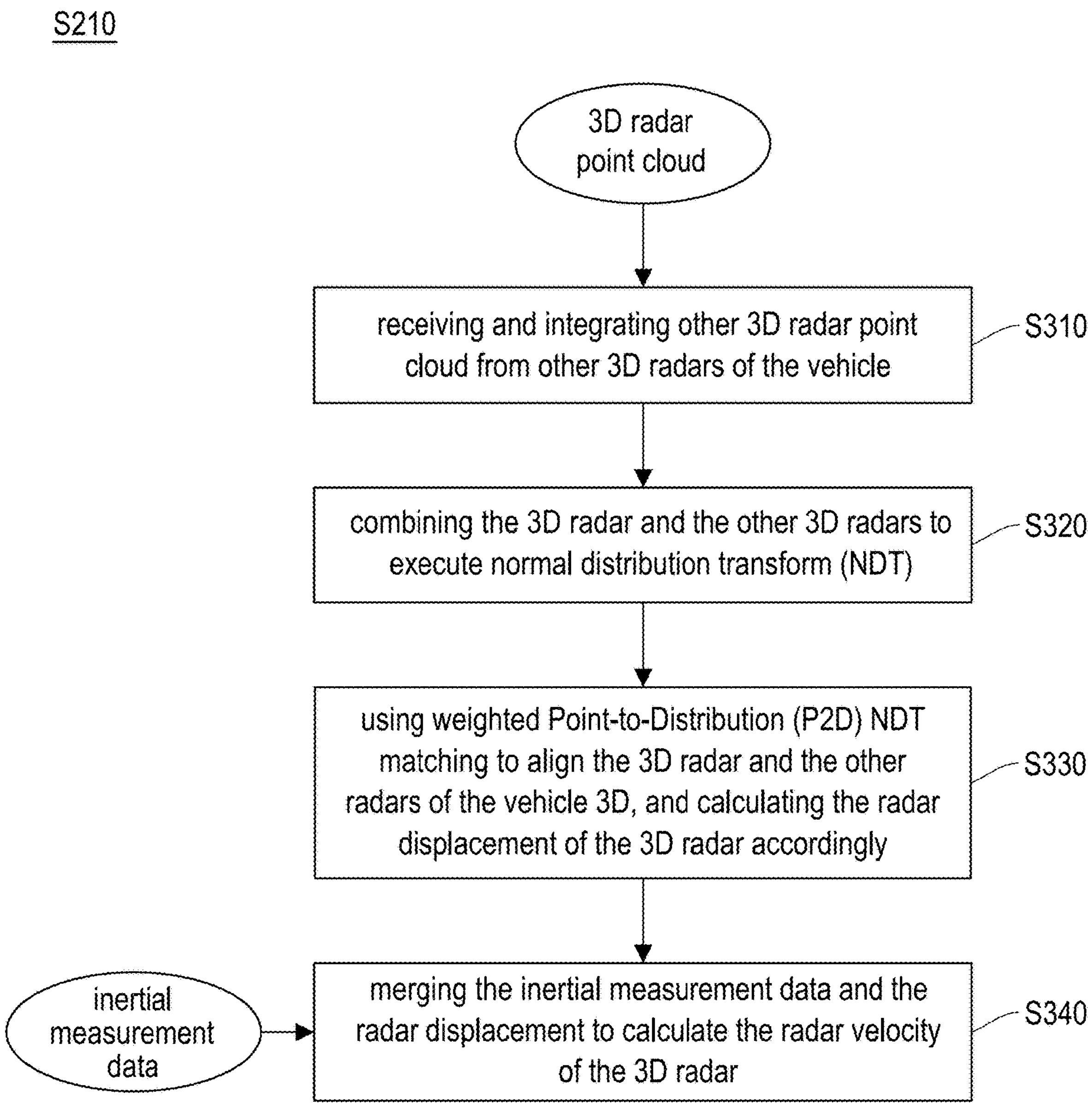
FIG. 3 is a flowchart illustrating the process of calculating the radar displacement and radar velocity of the 3D radar in a height information reconstruction method according to an embodiment of the present disclosure.

The normal distribution transform-based radar odometry method consists of a probabilistic submap module, a normal distribution transform (NDT) module, and an NDT matching module. FIG. 3 is a flowchart illustrating the process of calculating the radar displacement and radar velocity of the 3D radar in the height information reconstruction method 2 according to an embodiment of the present disclosure.

The process of constructing the probabilistic submap module involves integrating multiple radar scans while considering measurement uncertainties and self-motion. At step S310, the processor 13 receives and integrates other 3D radar point cloud from other 3D radars of the vehicle. It involves deploying ego-velocity estimation, which is calculated using radial velocity measurements combined with multiple radar scans.

Subsequently, considering uncertainties, at step S320, the processor 13 combines the 3D radar and other 3D radars to execute normal distribution transform, converting the combined radar scans into a set of local normal distribution functions, namely the probabilistic NDT.

At step S330, after generating the probabilistic NDT, the processor 13 uses weighted Point-to-Distribution (P2D) NDT matching to align the 3D radar and other 3D radars, and calculates the radar displacement of the 3D radar accordingly.

The extended Kalman Filter seamlessly merges and integrates the estimates from radar odometry and the inertial measurement data generated from the inertial measurement unit 12. At step S340, the processor 13 merges the inertial measurement data and radar displacement to calculate the radar velocity of the 3D radar.

By leveraging the complementary robustness of these two different sensing modalities, the extended Kalman Filter ensures a robust estimation of ego-velocity and enhances the overall accuracy and reliability of the velocity estimation process. The position of the 3D radar on the x-axis and y-axis, as well as the yaw angle, are calculated by the processor 13 through radar odometry, while the acceleration of the 3D radar on the x-axis and y-axis, as well as the yaw rate, are calculated by the processor 13 using the inertial measurement data generated by the inertial measurement unit 12. By integrating these diverse sources of information, the extended Kalman Filter achieves a robust estimation of ego-velocity, improving accuracy and reliability.

Please refer to FIG. 1 and FIG. 2 again. At step S220, the processor 13 calculates the radial velocity of each entity according to the radar velocity.

Figure 4:
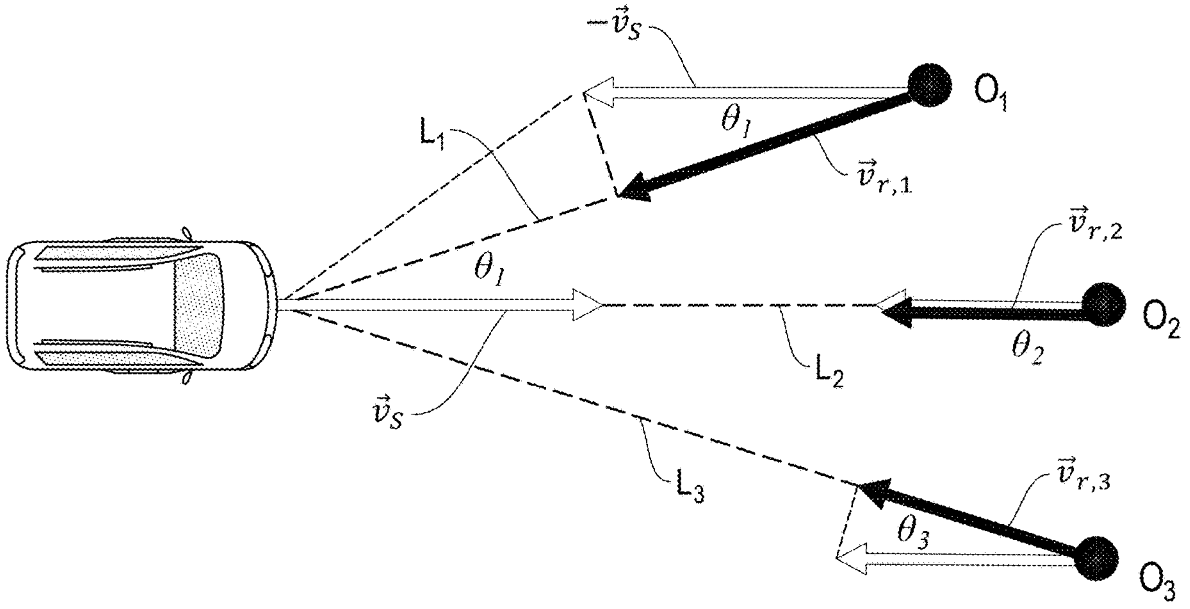
FIG. 4 is a schematic diagram illustrating the radar velocity and the radial velocity of entities according to an embodiment of the present disclosure.

FIG. 4 is a schematic diagram illustrating the radar velocity $\vec{v}_S$ and the radial velocities $\vec{v}_{r,i}$ of entities $O_1$, $O_2$, $O_3$ according to an embodiment of the present disclosure. As shown in FIG. 4, taking entity $O_1$ as an example, when the 3D radar on the vehicle has a radar velocity $\vec{v}_S$, entity $O_1$ has a relative velocity of $-\vec{v}_S$ with respect to the 3D radar. From FIG. 4, it can be seen that the relative velocity $-\vec{v}_S$ and an azimuth angle $\theta_1$ of entity $O_1$ relative to the 3D radar (i.e., the angle between entity $O_1$ and the connection line $L_1$ with the 3D radar), the radial velocity $\vec{v}_{r,1}$ of entity $O_1$ is the scalar projection of the relative velocity-$\vec{v}_S$ of the radar velocity $\vec{v}_S$ of entity $O_1$ relative to the 3D radar onto the direction of the connection line between entity $O_1$ and the 3D radar. Therefore, the relationship between the radar velocity and the radial velocity of the i-th entity is:

$$\vec{v}_{r,i} = -\vec{v}_S \cdot \cos\theta_i \tag{1}$$

Similarly, based on the above relationship (1), the radial velocities $\vec{v}_{r,2}$ and $\vec{v}_{r,3}$ of entities $O_2$ and $O_3$ can be calculated respectively according to the azimuth angles $\theta_2$ and $\theta_3$ of entities $O_2$ and $O_3$ relative to the 3D radar (i.e., the angles between entities $O_2$ and $O_3$ and the connection lines $L_2$ and $L_3$ with the 3D radar) between the connection lines $L_2$ and $L_3$.

At step S230, the processor 13 executes dynamic segmentation based on the radar velocity $\vec{v}_S$ and the radial velocity $\vec{v}_{r,i}$ to extract static entities from the entities.

In detail, how to extract static entities from entities, that is, the typical method for static entity detection is to use a constant corridor threshold on the radial velocity distribution of static entities based on velocity distribution. The adaptive threshold is used to classify static entities and non-static entities. The velocity distribution describes the distribution of the radial velocity $\vec{v}_{r,i}$ of the i-th static entity on its azimuth angle $\theta_i$, where all static entities should confirm this distribution in a 2D flat scene. However, in non-flat scenes, for example, when a vehicle passes through high-altitude static entity (such as a bridge), the high-altitude static entity will be misclassified as a non-static entity. As described in the previous section, at the same orientation, the absolute value $|\vec{v}_{r,i}|$ of the radial velocity $\vec{v}_{r,i}$ will decrease, while the height of the static entity will increase.

Figure 5:
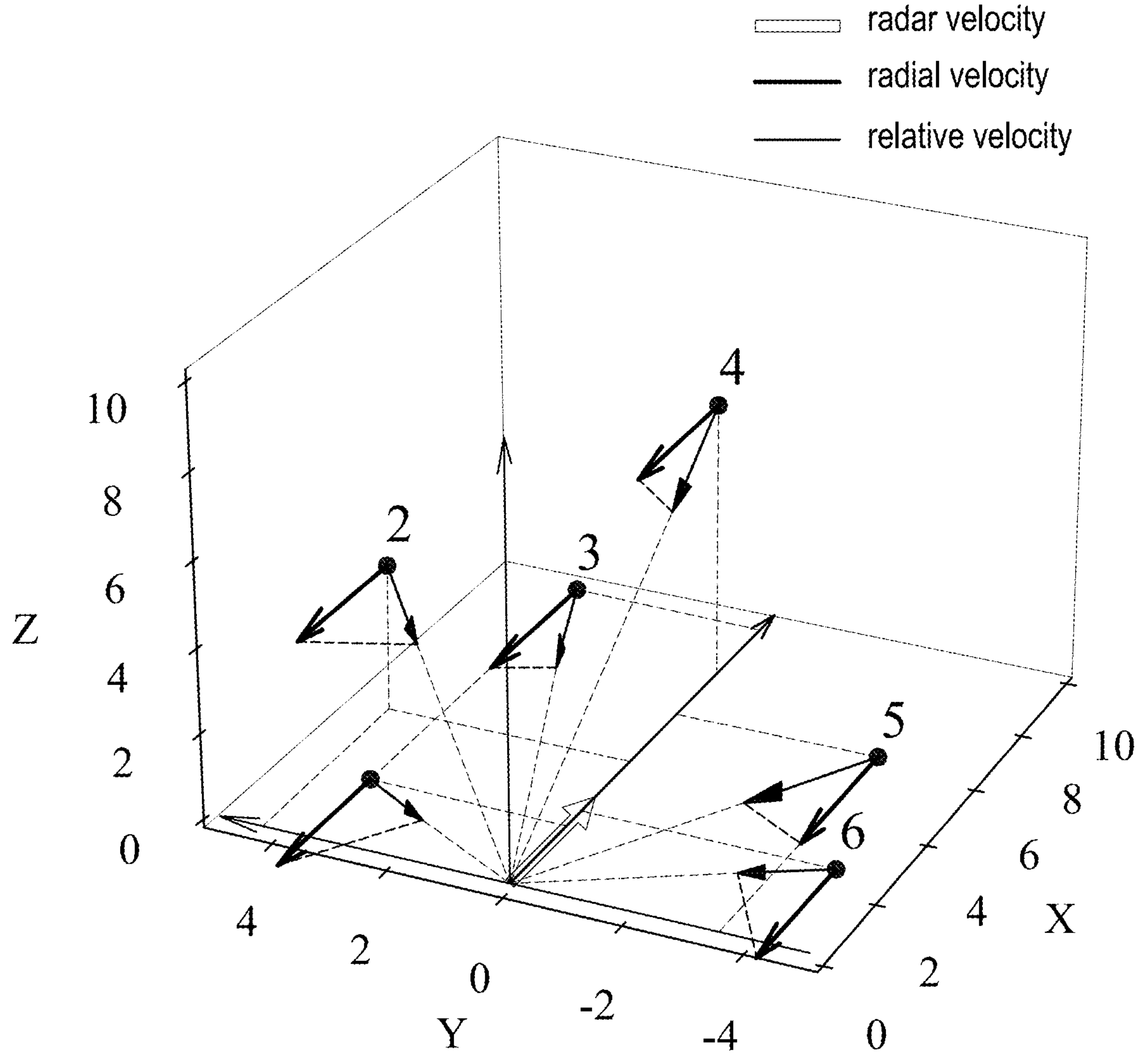
FIG. 5 is a schematic diagram illustrating the radar velocity, radial velocity, and relative velocity of static entities at different heights in a 3D scene according to an embodiment of the present disclosure.

FIG. 5 is a schematic diagram illustrating the radar velocity $\vec{v}_S$, radial velocity $\vec{v}_{r,i}$, and relative velocity $-\vec{v}_S$ of static entities at different heights in a 3D scene according to an embodiment of the present disclosure. As shown in FIG. 5, for example, static entity 2 and static entity 4 located at relatively high altitudes in FIG. 5, when the decrease in the absolute value $|\vec{v}_{r,i}|$ of the radial velocity exceeds the adaptive threshold, the relatively high-altitude static entity 2 and static entity 4 may be misclassified as non-static entities. To solve this misclassification problem, a larger adaptive threshold may be used to include high-altitude static entities. However, this may also cause non-dynamic entities to be misclassified as static entities, such as misclassifying more non-static entities as static entities located at high altitudes.

For example, when considering a scene where a vehicle is driving on a highway at a velocity of 100 kilometers per hour, and the vertical field of view of an entity in front of the vehicle relative to the 3D radar on the vehicle is 20°, the tolerance ($|\vec{v}_S|-v_{thr}(\theta)$) of the radial velocity $\vec{v}_{r,i}$ of the entity at the azimuth angle equal to 0° is approximately 7.7 km/h. The dynamic entities (such as vehicles in front) traveling at velocity lower than 7.7 km/h may be misclassified as static entities appearing at elevation angles between zero and the vertical field of view, which is very dangerous.

In the technology of this disclosure, the adaptive threshold $v_{thr}(\theta)$ may be made adjustable according to the vertical field of view $\phi_{FOV}$ of the 3D radar, rather than a constant threshold. The adaptive threshold $v_{thr}(\theta)$ of this disclosure is determined based on the estimated radar velocity $\vec{v}_S$ and the vertical field of view Prov of the 3D radar, with the following relationship:

$$v_{thr}(\theta) = \begin{bmatrix} v_{S,x} \\ v_{S,y} \end{bmatrix} \cdot \begin{bmatrix} \cos\theta_i \\ \sin\theta_i \end{bmatrix} \cdot \cos\phi_{FOV} + v_{S,z} \cdot \sin\phi_{FOV} \tag{3}$$

The technology of this disclosure optimizes the static entity detection process by dynamically adjusting the adaptive threshold $v_{thr}(\theta)$ based on the vertical field of view $\phi_{FOV}$ of the 3D radar, and improves the efficiency of classifying static and non-static entities in complex non-flat scenes (such as passing through bridges).

When the processor 13 has extracted the static entities from the entities in front of the vehicle, at step S240, the processor 13 calculates the elevation angle of the static entities.

The elevation angle $\phi_i$ of the static entity is calculated by the processor 13 according to the following partial differential equation (3):

$$\phi_i = \pm\cos^{-1}\left(\frac{|\vec{v}_{r,i}|}{\sqrt{\left(\begin{bmatrix} v_{S,x} \\ v_{S,y} \end{bmatrix} \cdot \begin{bmatrix} \cos\theta_i \\ \sin\theta_i \end{bmatrix}\right)^2 + v_{S,z}^2}}\right) + \tan^{-1}\left(\frac{v_{S,z}}{\begin{bmatrix} v_{S,x} \\ v_{S,y} \end{bmatrix} \cdot \begin{bmatrix} \cos\theta_i \\ \sin\theta_i \end{bmatrix}}\right) \tag{3}$$

Figure 6:
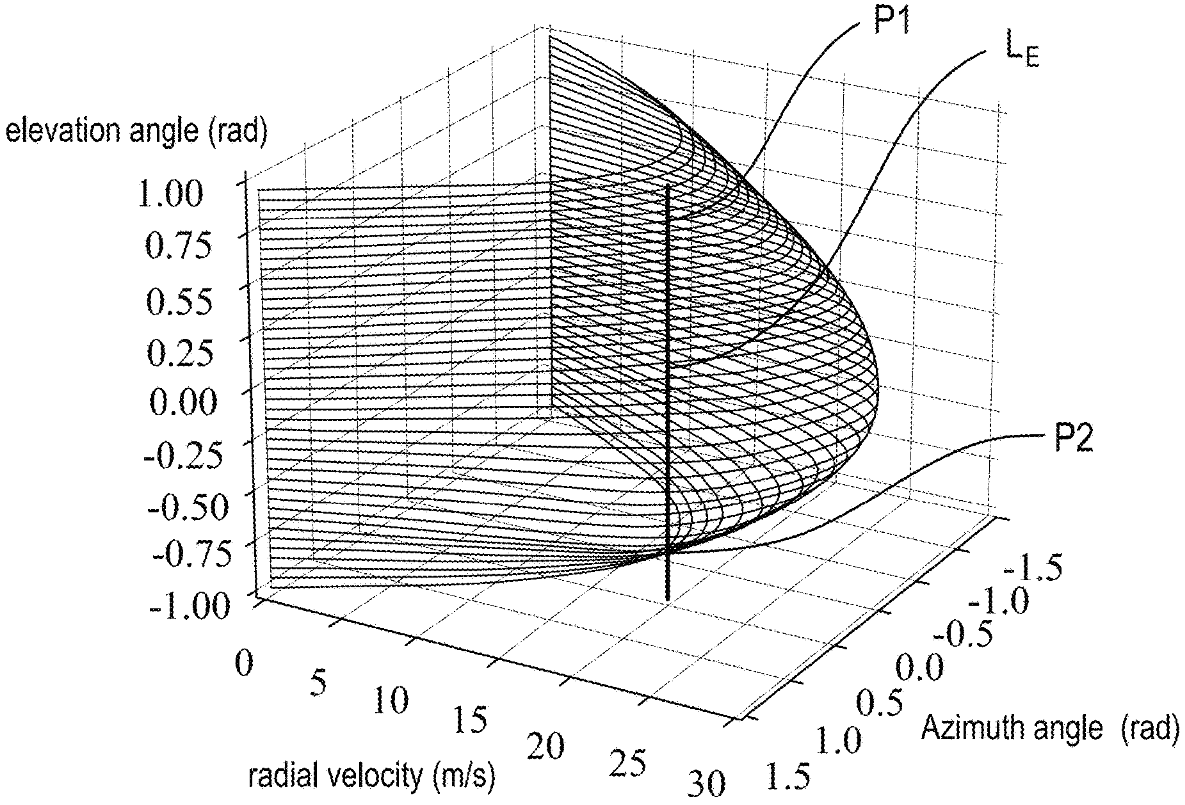
FIG. 6 is a diagram illustrating the relationship between the radial velocity, azimuth angle, and elevation angle of static entities according to an embodiment of the present disclosure.

However, the sign of the arccosine element is still undetermined. FIG. 6 is a relationship diagram illustrating the relationship between the radial velocity $\vec{v}_{r,i}$, azimuth angle $\theta_i$, and elevation angle $\phi_i$ of the static entity according to an embodiment of this disclosure. As shown in FIG. 6, after the azimuth angle $\theta_i$ and radial velocity $\vec{v}_{r,i}$ are given in the partial differential equation (3), there may be two possible values for the elevation angle $\phi_i$, namely the two intersection points P1 and P2 of the connection $L_E$ on the relationship diagram.

It is assumed that the elevation angles of all static entities relative to the 3D radar are not less than zero. In other words, it is assumed that all static entities are not below the xy plane in the coordinate system of the 3D radar. Since the arccosine element dominates the elevation angle when the vehicle velocity is high, we may eliminate the negative solution of the elevation angle. In one embodiment, the processor 13 is further used to take the larger value of the two calculation results of the partial differential equation (3) as the elevation angle of the static entity.

This assumption is made because in most driving scenes, all entities are located above the plane of the 3D radar. In the experiments of this disclosure, the 3D radar is mounted on the front bumper of the vehicle, at a height of 0.8 m from the ground, which is basically close enough to the ground. Based on this assumption, the negative solution of the elevation angle is ignored, thus determining the elevation angle of the static entity. Although this assumption may not hold in all cases, it is a reasonable approximation in most driving situations where static entities are not located on the ground.

To mitigate measurement uncertainties, this disclosure uses an extended Kalman filter to utilize information across time. This process borrows ideas from multi-entity tracking, including prediction, association, and update steps, which improves accuracy by merging measurement results from previous and current times using entity tracking algorithms. At step S250, the processor 13 executes temporal filtering based on the elevation angle $\phi_i$ and radar displacement to calculate the height value of the static entity.

In the prediction step of the Kalman filter, the radar displacement $\Delta p$ (obtained from the radar odometer) of the 3D radar is used as the control input, and a constant velocity model is used. The prediction step for the k-th frame may be written as: $x_{k+1}=x_k+[\Delta p_k, 0, \widehat{v_k}\Delta t]^T$, where $\Delta t$ is the time difference between two frames.

The association step is executed using greedy matching based on the Mahalanobis distance in the radar measurement space. Measurements with a Mahalanobis distance greater than 1 may be considered as another track.

The update step includes two types of measurements: radar measurement and velocity measurement. The velocity measurement may be updated after predicting each track, while the radar measurement may only update the tracks associated with the current measurement.

The temporal filtering process may effectively estimate the position of the target and the uncertainty of the estimation, thereby improving the accuracy and stability of the entire system.

At step S260, the processor 13 generates a height information reconstructed radar point cloud according to the height value of the static entity.

The height information reconstruction system 1 and height information reconstruction method 2 disclosed in this disclosure provide a simple and effective method to estimate the elevation angle of static entities detected by 3D radar of the vehicle while in motion. This may be based on the radial velocity $\vec{v}_{r,i}$, azimuth angle $\theta_i$ measurement, and the elevation angle $\phi_i$ of the static entity.

In summary, the height information reconstruction system and height information reconstruction method provided by this disclosure may estimate the elevation angle of static entities based on the relative velocity and radial velocity measurements of the vehicle radar. By reconstructing the elevation angle on the 3D vehicle radar, it may solve the problem of missing altitude information in 3D vehicle radars, achieving the effect of six-degree-of-freedom positioning and obstacle avoidance. This technology may even be widely applied to existing vehicle models with automatic and assisted driving capabilities.

What is claimed is:

1. A height information reconstruction system, adapted to a vehicle, comprising:

a 3D radar, disposed on the vehicle, and configured to sense a plurality of entities to generate a 3D radar point cloud corresponding to the vehicle;

an inertial measurement unit, disposed on the vehicle, and configured to sense the plurality of entities to generate inertial measurement data corresponding to the vehicle; and a processor, coupled to the 3D radar and the inertial measurement unit, and configured to: receive the 3D radar point cloud and the inertial measurement data, and calculating a radar displacement and a radar velocity of the 3D radar accordingly;

calculate a radial velocity for each of the plurality of entities according to the radar velocity;

execute dynamic segmentation based on the radar velocity and the radial velocities to extract static entities from the plurality of entities;

calculate an elevation angle for each of the static entities;

execute temporal filtering based on the elevation angles and the radar displacement to calculate a height value for each of the static entities; and generate a height information reconstructed radar point cloud according to the height values of the static entities.

2. The height information reconstruction system according to claim 1, wherein the processor is further configured to:

receive and integrate other 3D radar point cloud from other 3D radars of the vehicle;

combine the 3D radar and the other 3D radars to execute normal distribution transform (NDT);

use weighted Point-to-Distribution (P2D) NDT matching to align the 3D radar and the other 3D radars of the vehicle, and calculate the radar displacement of the 3D radar accordingly; and merge the inertial measurement data and the radar displacement to calculate the radar velocity of the 3D radar.

3. The height information reconstruction system according to claim 1, wherein the radial velocity of the i-th entity is a scalar projection of the relative velocity of the i-th entity with respect to the radar velocity onto the connection direction between the i-th entity and the 3D radar, wherein the relationship between the radar velocity and the radial velocity of the i-th entity is:

$$\vec{v}_{r,i} = -\vec{v}_S \cdot \cos\theta_i;$$

wherein $\vec{v}_{r,i}$ is the radial velocity of the i-th entity, $\theta_i$ is the azimuth angle of the i-th entity, and $\vec{v}_S$ is the radar velocity.

4. The height information reconstruction system according to claim 3, wherein the elevation angle of a static entity is calculated by the processor according to the following partial differential equation:

$$\phi_i = \pm\cos^{-1}\left(\frac{|\vec{v}_{r,i}|}{\sqrt{\left(\begin{bmatrix} v_{S,x} \\ v_{S,y} \end{bmatrix}\cdot\begin{bmatrix} \cos\theta_i \\ \sin\theta_i \end{bmatrix}\right)^2 + v_{S,z}^2}}\right) + \tan^{-1}\left(\frac{v_{S,z}}{\begin{bmatrix} v_{S,x} \\ v_{S,y} \end{bmatrix}\cdot\begin{bmatrix} \cos\theta_i \\ \sin\theta_i \end{bmatrix}}\right);$$

wherein $\phi_i$ is the elevation angle of the static entity, $v_{S,x}$ is a component velocity of the radar velocity on the x-axis, $v_{S,y}$ is a component velocity of the radar velocity on the y-axis, and $v_{S,z}$ is a component velocity of the radar velocity on the z-axis.

5. The height information reconstruction system according to claim 4, wherein the processor is further configured to take a larger value of the two calculation results of the partial differential equation as the elevation angle of the static entity.

6. A height information reconstruction method, adapted to a vehicle, comprising:

sensing a plurality of entities through a 3D radar to generate 3D radar point cloud corresponding to the vehicle;

sensing the plurality of entities through an inertial measurement unit to generate inertial measurement data corresponding to the vehicle; and executing through a processor:

receiving the 3D radar point cloud and the inertial measurement data, and calculating a radar displacement and a radar velocity of the 3D radar accordingly;

calculating a radial velocity for each of the plurality of entities according to the radar velocity;

executing dynamic segmentation based on the radar velocity and the radial velocity to extract static entities from the plurality of entities;

calculating an elevation angle for each of the static entities;

executing temporal filtering based on the elevation angles and the radar displacement to calculate a height value of the static entities; and generating a height information reconstructed radar point cloud according to the height values of the static entities.

7. The height information reconstruction method according to claim 6, further comprising:

executing through the processor:

receiving and integrating other 3D radar point cloud from other 3D radars of the vehicle;

combining the 3D radar and the other 3D radars to execute normal distribution transform (NDT);

using weighted Point-to-Distribution (P2D) NDT matching to align the 3D radar and the other 3D radars of the vehicle, and calculating the radar displacement of the 3D radar accordingly; and merging the inertial measurement data and the radar displacement to calculate the radar velocity of the 3D radar.

8. The height information reconstruction method according to claim 6, wherein the radial velocity of the i-th entity is a scalar projection of the relative velocity of the i-th entity with respect to the radar velocity onto the connection direction between the i-th entity and the 3D radar, wherein the relationship between the radar velocity and the radial velocity of the i-th entity is:

$$\vec{v}_{r,i} = -\vec{v}_S \cdot \cos\theta_i;$$

wherein $\vec{v}_{r,i}$ is the radial velocity of the i-th entity, $\theta_i$ is the azimuth angle of the i-th entity, and $\vec{v}_S$ is the radar velocity.

9. The height information reconstruction method according to claim 8, wherein the elevation angle of a static entity is calculated by the processor according to the following partial differential equation:

$$\phi_i = \pm\cos^{-1}\left(\frac{|\vec{v}_{r,i}|}{\sqrt{\left(\begin{bmatrix} v_{S,x} \\ v_{S,y} \end{bmatrix} \cdot \begin{bmatrix} \cos\theta_i \\ \sin\theta_i \end{bmatrix}\right)^2 + v_{S,z}^2}}\right) + \tan^{-1}\left(\frac{v_{S,z}}{\begin{bmatrix} v_{S,x} \\ v_{S,y} \end{bmatrix} \cdot \begin{bmatrix} \cos\theta_i \\ \sin\theta_i \end{bmatrix}}\right);$$

wherein $\phi_i$ is the elevation angle of the static entity, $v_{S,x}$ is a component velocity of the radar velocity on the x-axis, $v_{S,y}$ is a component velocity of the radar velocity on the y-axis, and $v_{S,z}$ is a component velocity of the radar velocity on the z-axis.

10. The height information reconstruction system according to claim 9, further comprising:

taking a larger value of two calculation results from the partial differential equation as the elevation angle of the static entity through the processor.

* * * * *